United States Patent [19]

Jones

[11] E Patent Number: Re. 33,550

[45] Reissued Date of Patent: Mar. 12, 1991

[54] RESTRAINT EDGE FOR PAVING MEMBERS

[76] Inventor: Stephen Jones, 10800 Morris Ave., South Bloomington, Minn. 55437

[21] Appl. No.: 511,315

[22] Filed: Apr. 19, 1990

Related U.S. Patent Documents

Reissue of:

[64] Patent No.: 4,863,307
Issued: Sep. 5, 1989
Appl. No.: 213,303
Filed: Jun. 29, 1988

U.S. Applications:

[63] Continuation-in-part of Ser. No. 103,658, Oct. 2, 1987, abandoned.

[51] Int. Cl.[5] ..... E01C 11/22
[52] U.S. Cl. ..... 404/7; 404/8
[58] Field of Search ..... 404/2, 3, 7, 8, 17, 404/34, 40; 47/23-25, 32, 33; 52/102, 585; 256/1, 32

[56] References Cited

U.S. PATENT DOCUMENTS

| | | | |
|---|---|---|---|
| 17,138 | 4/1857 | Cornell | 404/2 |
| 104,213 | 6/1870 | Scott | 138/157 |
| 113,007 | 3/1871 | Biehl | 404/2 |
| 131,588 | 9/1872 | Ames | 404/2 |
| 159,699 | 2/1875 | Miller | 404/27 |
| 295,334 | 3/1884 | Berry | 138/117 |
| 329,344 | 10/1885 | Sutton | 404/3 |
| 358,778 | 3/1887 | Holt | 404/3 |
| 379,401 | 3/1888 | Koplin | 404/7 |
| 398,074 | 2/1889 | Parkhurst | 404/2 |
| 398,630 | 2/1889 | Landis | 404/7 |
| 425,913 | 4/1890 | Smith | 404/3 |
| 427,648 | 5/1890 | Webb | 404/3 |
| 431,780 | 7/1890 | Parsley | 138/117 |
| 434,076 | 8/1890 | Zopke | 174/726 |
| 442,060 | 12/1890 | Landis | 404/2 |
| 456,995 | 8/1891 | Landis | 404/7 |
| 458,788 | 9/1891 | Jungbluth | 119/28 |
| 477,721 | 6/1892 | Webb | 404/2 |
| 506,018 | 10/1893 | Sampson | 404/3 |
| 510,016 | 12/1893 | Gaffney | 404/2 |
| 567,173 | 9/1896 | Schillinger | 75/736 |
| 606,151 | 6/1898 | Johnson | 47/33 |
| 670,001 | 3/1901 | Morss | 404/7 |
| 806,563 | 12/1905 | Owen | 404/7 |
| 867,388 | 10/1907 | Lerch | 404/7 |
| 1,257,768 | 12/1915 | Turner | 47/33 |
| 1,349,340 | 8/1920 | Hotchkiss | 404/7 X |
| 1,710,574 | 11/1927 | Ginnetti | 249/3 |
| 1,713,751 | 5/1928 | Dorogi et al. | 428/12 |
| 1,727,516 | 8/1927 | Miller | 249/3 |
| 1,764,029 | 9/1928 | Miller | 249/3 |
| 1,879,281 | 2/1931 | Jarchow | 404/7 |
| 1,894,395 | 4/1933 | Burrell | 404/134 |
| 1,916,494 | 6/1932 | Schrickel | 47/33 |
| 1,936,740 | 3/1931 | Wolf | 249/192 |
| 1,939,007 | 1/1931 | Heltzel | 264/31 |
| 1,961,227 | 10/1932 | Klick | 404/7 |
| 1,979,979 | 9/1932 | Martini | 47/33 |
| 2,029,343 | 4/1933 | Sperr | 47/9 |
| 2,184,904 | 5/1939 | Boehme | 47/33 |
| 2,678,482 | 4/1953 | Cuthbertson et al. | 249/4 |
| 2,713,751 | 9/1951 | Hendrixson | 47/33 |
| 2,738,563 | 4/1951 | Steele | 249/195 |
| 2,822,644 | 6/1955 | Berger | 47/32 |
| 2,842,344 | 3/1956 | Todd | 256/21 |
| 2,877,600 | 3/1959 | Slate | 47/33 |
| 2,912,792 | 2/1958 | Venable | 47/33 |
| 2,920,184 | 1/1960 | Kessler | 47/33 X |
| 2,940,152 | 3/1956 | Riehl | 249/188 |
| 2,985,938 | 4/1958 | Rappas | 264/316 |
| 3,034,613 | 2/1959 | Heltzel | 403/22 |
| 3,144,700 | 3/1963 | Heltzel | 249/3 |
| 3,281,988 | 11/1966 | Cohen | 47/33 |
| 3,287,851 | 10/1965 | Cramer | 47/25 |
| 3,315,752 | 10/1964 | Pasquini | 47/33 X |
| 3,384,351 | 11/1966 | Turner, Jr. | 256/32 |
| 3,387,786 | 1/1967 | Rynberk | 239/201 |
| 3,484,989 | 12/1967 | Lazinsky | 404/7 |
| 3,485,449 | 10/1967 | Wilson | 47/33 |
| 3,495,352 | 12/1967 | Sbare | 47/33 |
| 3,515,373 | 2/1969 | Abbe | 256/32 |
| 3,520,082 | 1/1968 | Smith | 404/7 |
| 3,545,127 | 12/1970 | Jensen | 47/33 |
| 3,545,128 | 10/1968 | La Fontaine et al. | 47/33 |
| 3,559,338 | 4/1968 | Klingberg | 47/33 |
| 3,571,972 | 2/1969 | Carter, Jr. | 47/32 |
| 3,619,944 | 7/1970 | Matvey | 47/33 |
| 3,676,952 | 7/1972 | Watts | 47/33 |
| 3,713,624 | 1/1973 | Niemann | 47/33 |
| 3,724,128 | 4/1973 | Tabone | 47/33 |
| 3,762,113 | 10/1973 | O'Mullan et al. | 404/7 |

| | | | |
|---|---|---|---|
| 3,768,780 | 10/1973 | Cowles et al. | 256/1 |
| 3,777,421 | 12/1973 | Bomba et al. | 47/33 |
| 3,788,001 | 1/1974 | Balfanz, Jr. | 404/7 |
| 3,803,760 | 4/1974 | Matvey | 47/33 |
| 3,806,096 | 4/1974 | Eccleston et al. | 256/32 |
| 3,841,022 | 10/1974 | Thodos | 47/33 |
| 3,844,073 | 10/1974 | Peletz | 404/8 |
| 3,857,195 | 12/1974 | Johnson | 47/32 |
| 3,862,876 | 1/1975 | Graves | 161/44 |
| 3,885,364 | 5/1975 | Lankheet | 52/102 X |
| 4,068,968 | 1/1978 | Gagle | 404/7 |
| 4,074,479 | 2/1978 | Krupka | 404/7 |
| 4,176,982 | 12/1979 | Boswell | 404/7 |
| 4,202,145 | 5/1980 | Coulter et al. | 52/169.1 |
| 4,219,941 | 9/1980 | Hair | 47/33 |
| 4,222,197 | 9/1980 | Johnson | 47/33 |
| 4,281,473 | 8/1981 | Emalfarb | 47/33 |
| 4,349,596 | 9/1982 | Hendrix | 428/83 |
| 4,372,079 | 2/1983 | Trageser | 47/33 |
| 4,381,622 | 5/1983 | Spidell | 47/33 |
| 4,443,981 | 4/1984 | Weiss | 52/155 |
| 4,463,529 | 8/1984 | Singer | 52/169.5 |
| 4,466,222 | 8/1984 | Mitchell | 52/371 |
| 4,478,391 | 10/1984 | Kovach | 256/1 |
| 4,497,472 | 2/1985 | Johnson | 256/32 |
| 4,548,388 | 10/1985 | Cobler | 256/32 |
| 4,595,175 | 6/1986 | Kauffman et al. | 256/1 |
| 4,628,632 | 12/1984 | Zwier | 47/33 |
| 4,644,685 | 12/1980 | Tisbo | 47/33 |
| 4,648,203 | 3/1987 | Worzek | 47/32 |
| 4,663,883 | 5/1987 | Hilliard et al. | 47/33 |
| 4,690,382 | 9/1987 | Koperdak | 256/1 |
| 4,700,507 | 10/1987 | Allen | 47/23 |
| 4,702,034 | 10/1987 | Ferguson et al. | 47/33 |
| 4,723,752 | 2/1988 | Thomas | 249/4 |
| 4,761,923 | 8/1986 | Reum | 52/102 |
| 4,809,459 | 3/1989 | Brylla | 47/33 |
| 4,824,068 | 4/1989 | Ferland | 249/2 |
| 4,831,776 | 5/1989 | Fritch | 404/12 X |
| 4,846,437 | 7/1989 | Fitzgerald | 249/14 X |

FOREIGN PATENT DOCUMENTS

| | | |
|---|---|---|
| 0006033 | 7/1872 | Fed. Rep. of Germany . |
| 1658454 | 3/1967 | Fed. Rep. of Germany . |
| 7022276 | 6/1970 | Fed. Rep. of Germany . |
| 7149466 | 12/1971 | Fed. Rep. of Germany . |
| 7200914 | 1/1972 | Fed. Rep. of Germany . |
| 2336535 | 7/1973 | Fed. Rep. of Germany . |
| 2912030 | 3/1979 | Fed. Rep. of Germany . |
| 3600738 | 1/1986 | Fed. Rep. of Germany . |
| 1333889 | 6/1962 | France . |
| 1464843 | 11/1965 | France . |
| 1586489 | 9/1968 | France . |
| 1422293 | 3/1972 | France . |
| 2161427 | 6/1973 | France . |
| 2384896 | 3/1977 | France . |
| 2414584 | 1/1978 | France . |
| 1247743 | 5/1969 | United Kingdom . |

OTHER PUBLICATIONS

"Report on Study Visit to Belgium and the Netherlands", Cement & Concrete Assoc., Publ. DN/2044, Jun. 1974, pp. 1 & 6.

"A Study Visit to Germany & Denmark", Cement & Concrete Assoc., Pub. DN/2046, Mar. 1975, pp. 1 & 12.

"Concrete Block Paving", Proceedings of the First Int'l. Conf on Concrete Block Paving, Sep. 2-5, 1980, pp. 1, 34, 36, 62, 73-74, 76, 153.

"Concrete Block Paving", Second Int'l. Conf. on Concrete Block Paving, 1984, pp. 1, 185, 188 & 211.

"Proceedings of an Int'l. Workshop on Interlocking Concrete Pavements", Royal Melbourne Inst. of Tech., Sep. 1986, pp. 1, 79, 100 & 134.

"Proceedings of the 3rd Int'l. Conf. on Concrete Block Paving", May 1988, pp. 1, 155, 214, 347, 350, 363, 374, 379, 406 & 455.

Exhibit A—"Plasti-Chain".

Exhibit B—"Hexagon" Paper.

Exhibit C—"Tree Well" Brochure.

Exhibit N—"Weed Block", Brochure.

Exhibit O—"Weed Control Drainage Soil Separation" Brochure.

Exhibit P—"Soil Stabilization" Brochure.

*Primary Examiner*—Ramon S. Britts

*Assistant Examiner*—Gay Ann Spahn

*Attorney, Agent, or Firm*—Evenson, Wands, Edwards, Lenahan & McKeown

[57] ABSTRACT

Landscaping support apparatus is provided which includes substantially vertical strip restraining elements for defining a boundary around hard surface elements. The vertical strip restraining elements include an inner surface facing toward the hard surface elements for receiving substantially horizontal forces from the hard surface elements. Horizontal extension elements are provided which extend out from an outer surface of the vertical strip restraining elements in at least the lower region of the upright strip restraining elements for receiving vertical forces relative to the ground surface. Force converting elements are provided for converting the horizontal forces received by the vertical strip restraining elements into vertical forces against the horizontal extension elements, thereby restraining the hard surface elements in the boundary. Attaching elements are provided which permit a detachable mounting of at least one of the horizontal extension elements and the force converting elements to the vertical strip restraining elements.

119 Claims, 3 Drawing Sheets

RESTRAINT EDGE FOR PAVING MEMBERS

Matter enclosed in heavy brackets [ ] appears in the original patent but forms no part of this reissue specification; matter printed in italics indicates the additions made by reissue.

CROSS-REFERENCE TO RELATED APPLICATION

This application is a Continuation-in-Part application of U.S. Pat. application Ser. No. 103,658, filed Oct. 2, 1987, now abandoned.

BACKGROUND AND SUMMARY OF THE INVENTION

An edge restraint is provided for maintaining hard surfaces such as paving stones within a predetermined boundary.

Hard surfaces, such as paving stones, used for various types of traffic are placed over a base surface such as sand or gravel which is as level as possible. The base surface provides vertical support for the paving stones. However, when the stones are loaded with traffic from above, there is a lateral or horizontal force outward which is not adequately controlled by the level base surface. This horizontal force tends to shift the paving stones horizontally creating wider cracks and extending the outer boundary of the paved surface.

Therefore, it is desirable to have some type of edging material along the outside perimeter of the installed paving stones to maintain these paving stones within a fixed boundary such that horizontal forces will not cause the paving stones to separate or spread horizontally outward.

In certain known arrangements, the paved area abuts masonry edges which can be preformed such as bricks, or which can be in the form of poured concrete. Customarily, a band of concrete is poured deep enough and wide enough to provide the necessary edging for the anticipated load. If the load is not too heavy, this process can also be done by laying bricks which are held together by mortar.

A fundamental problem with masonry edging is that in order to provide an adequate restraint edge, this edging is often expensive, time consuming to install, and tends to take up a lot of space. The expense largely results from the fact that it is quite time consuming to prepare the necessary forms and then pour and finish the concrete after the installation of all the paving stones. Further, the complications involved with pouring concrete may also be involved. These complications can include problems with moist or wet soil or inclement weather during installation.

Another problem with the use or a concrete restraint is that after repeated force and aging, cracks or chips may form in the concrete and eventually ruin the integrity of the restraint. Other problems include the excessive weight of the materials used such as the blocks or bricks, or the concrete alone.

An alternative to the use of concrete or masonry edging is the use of preformed edge restraints. Examples of metal edge restraints used in combination as a curb are shown in several patents, for example, U.S. Pat. Nos. 379,401; 398,630 and 670,001. In U.S. Pat. No. 806,563, an example of an edge restraint, combination curb is also shown made from a combination of steel and concrete. All of these metal edge restraints share a common problem of rust corrosion and difficulty of handling. It is desirable to have a rather permanent edge restraint to avoid the expense and labor required to dig up and remove corroded edge restraints no longer strong enough to provide support, and to install replacement edge restraints.

With respect to the inconvenience and expense, first, these steel panels can be rather heavy. Further such panels are extremely difficult to manipulate. The steel restraints have little or no flexibility, rendering the restraints difficult to use with irregular patterned edge borders of paving stones. Also, to facilitate handling due to the excessive weight and the absence of flexibility to fit irregular patterns, these restraints require separate, short sections which are subsequently attached together when installed.

Also, as the concrete is obviously not flexible, irregular shaped pavement borders could not be easily provided. Although preformed curved sections may be available, it would be difficult to match these with actual dimensions of irregular surfaces and angles at the site of installation. This is especially the case with concrete block sections which would be extremely difficult to cut to a desired size and definitely cannot be kept.

Aluminum edge restraints may also be used. However, aluminum lacks strong structural resistance unless the restraint wall is extremely thick, thereby increasing the expense and increasing the difficulty in use due to decreased flexibility and increased weight. To be strong enough to successfully hold the paving stone border, the aluminum restraint would have to have an increased thickness, and therefore decreased flexibility rendering manipulation for irregular paving stone borders difficult.

Another problem shared by these edge restraints is that in all of these examples, the edge restraint is used in an attempt to prevent horizontal movement of paving stones by merely absorbing a horizontal force applied against the edge wall. The wall is only backed by the earth on the side of the wall opposite the paving stones. Dirt shifts under forces from a horizontal direction. None of these patents address converting the horizontal force applied from the paving stones into a vertical force down into the ground. Dirt is more likely to shift when the force is in a horizontal direction than if the force is down into the ground. Therefore, these restraint systems discussed above tend to give into horizontal forces.

A related problem associated with these systems is the absolute requirement for dirt or gravel, commonly referred to as backfill, filled in behind the wall for support. These vertical wall-type systems do not individually provide any support. Thus, dirt must be filled in behind them to support the newly installed paving stones. A deficiency of such systems is that when the paving stones are compacted, the backfilling operation must already have been performed. This can add time to the installation process.

Further, often landscaping is to be performed once the paving stones are in place. Thus, sod may be installed right up against the vertical wall edging. As backfilling is required for compaction, the landscaper may be forced to dig out soil to make room for sod after the paving stone installation is complete.

Not only does this add time to the job, but it presents the possibility of the landscaper accidentally ruining the integrity of the newly installed paving stone system. It would be desirable to avoid these problems by providing edging which does not require backfill to fully support the installed paving stones during compaction and/or upon completion of the installation.

Another problem associated with the preformed concrete, steel or aluminum edge restraints is that they do not provide flexibility to absorb forces and allow the material to flex back into shape after large forces such as vehicles run over a portion extending above the ground level. Therefore, in the case of aluminum edge restraints, significant deformation could occur if a heavy load is placed thereon. Once the deformation is formed, the portion of the deformed edge restraint extending could only be bent back to the proper shape with great effort.

Further, although the edge restraint patents discussed thus far serve as curbs and therefore are intended to extend above the ground, it is often desirable to provide edge restraints which do not extend above the ground level, for example, for the lining of driveways and sidewalks having an earth boundary on the outside of the edge restraint.

U.S. Pat. Nos. 1,349,340 and 1,894,395 show forms used in the pouring of concrete to hold the concrete in form while hardening. U.S. Pat. No. 1,894,395 is actually included in a poured structure as concrete is poured on either side of the center portion 3. Both of these patents are used in the different environment of concrete pouring.

As discussed above, it would be desirable to provide a lightweight edge material which uses the ground around it to provide increased strength for preventing horizontal shifting of paving stones.

Thus, an object of the invention is to provide an edge restraint to restrain paving stones in a predetermined boundary. Another object is to achieve increased restraint by utilizing the earth surrounding the edge restraint to provide support. A further object of the invention is to convert horizontal forces from paving stones into vertical forces down into the ground to provide added support for the edge restraint. Another object is to provide an edge restraint system that does not require backfilling during compaction or after installation is complete.

Other objects of the invention include providing an edge restraint with increased flexibility to facilitate maintaining irregular boundary areas and to protect the restraint from permanent damage due to unwanted permanent deformation.

Another object is to provide lightweight edge restraint which can be formed in continuous strips not requiring preformed curved sections. Another object of the invention is to provide an edge restraint which can be cut easily with a device such as a knife or with simple sawing to desired lengths and fashioned to desired curves.

Another object of the invention is to provide an edge restraint which provides increased support by converting horizontal forces into vertical forces into the ground along most of its length and not only at various points.

These objects are achieved by providing a landscaping support apparatus for edging and restraining hard surface elements in a given position on ground soil. The landscaping support apparatus includes substantially upright strip restraining elements which define a boundary around the hard surface elements. An inner surface of the upright elements faces toward the hard surface elements for receiving substantially horizontal forces from the hard surface elements. Extension elements are also provided which extend out from a surface opposite the inner surface of the upright elements. The extension elements are used for receiving vertical forces relative to the ground surface. Also provided are force converting elements for converting the horizontal forces received by the upright elements into vertical forces against the extension elements, thereby restraining the hard surface elements in the boundary.

According to advantageous features of certain preferred embodiments of the invention, the extension elements have a total length extending from the upright strip restraining elements longer than a length of the upright strip restraining elements extending from the extension elements to an upper end of the upright strip restraining elements.

According to other advantageous features of certain preferred embodiments of the invention, the force converting elements include a connecting strip extending between the extension elements and the upright strip restraining elements. In certain preferred embodiments, the upright strip restraining elements and the extension elements each include continuous strips which lie in perpendicular planes to one another. In certain preferred embodiments, the connecting elements include a connecting strip extending from the upper region of the upright strip to an outer end of the base strip, and also includes a cross strip extending from the juncture of the upright strip and the base strip to the connecting strip.

According to other advantageous features of [the] certain embodiments of the invention, the continuous base strip, connecting strip and cross strip include cut out portions at given intervals to provide increased flexibility to the entire landscaping support apparatus. In certain preferred embodiments holes are provided through the base strip, connecting strip and cross strip which receive stakes driven into the earth. Depending on the types of materials used for the hard surface elements such as bricks or paving stones, the intended magnitude of forces applied thereto, and the shape of the border desired, these cut out portions and stake holes are spaced predetermined distances along the landscaping support apparatus.

According to other advantageous features of certain preferred embodiments of the invention, attaching elements are included which provide a detachable mounting of at least one of the horizontal extension elements and the force converting elements to the vertical strip restraining elements. This system provides a variety of different applications of the system. In certain preferred embodiments, at least one of the horizontal extension elements and the force converting elements are included in a plurality of sections detachably disposed in spaced intervals on the vertical strip restraining elements. By spacing the detachable elements in intervals, the flexibility of the vertical strip restraining elements is increased. Thus, the system can be curved to accommodate irregular shaped paving stone boundaries.

According to other advantageous features of certain preferred embodiments of the invention, the horizontal extension elements and the force converting elements comprise separate attachment sections which are removably attached to the vertical strip restraining elements. In certain preferred embodiments, the vertical strip restraining elements are a continuous strip and the attachment sections are removably disposed in spaced intervals on the vertical strip. These preferred embodiments provide excellent flexibility for use in curved borders as well as simplicity of use.

According to other advantageous features of certain preferred embodiments of the invention, the landscaping support apparatus is a polyvinyl chloride (PVC) extrusion.

Other objects, advantages and novel features of the present invention will become apparent from the following detailed description of the invention when considered in conjunction with the accompanying drawings.

DETAILED DESCRIPTION OF THE DRAWINGS

Figure 1:
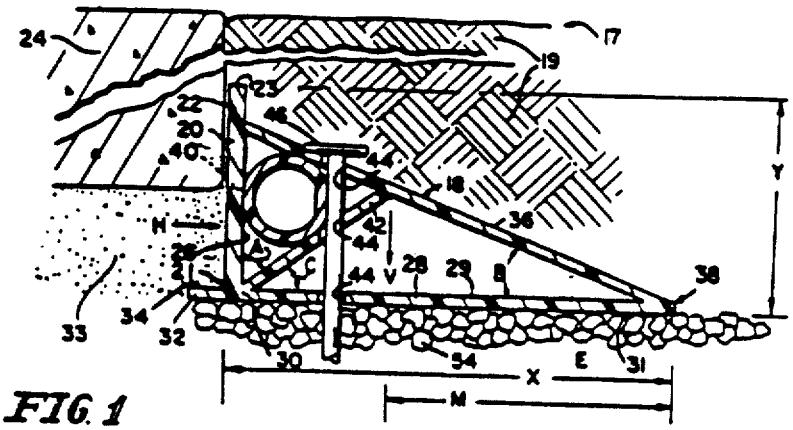
FIG. 1 is an end cross-sectional view of an embodiment of the invention in use.

FIG. 1 is a cross-sectional view through the edge restraint 18 according to a preferred embodiment of the invention. A substantially upright restraining strip 20 includes an inner surface which faces the paving stones 24 which are to be held in a defined boundary by the edge restraint. The upright restraining strip 20 also includes an outer surface 26 facing away from the paving stone 24. The upright restraining strip 20 has a lower end 21 and an upper end 23. In the preferred embodiment the entire edge restraint 18 is disposed beneath ground level 17 in soil 19.

Although the upright restraining strip 20 can have any height Y, the height is preferably in the range of about one to four inches depending on the size of the paving stones and the magnitude of the specific forces to which the edge restraint will be subjected. All the dimensions can vary depending on the type of material used in the paving stones, the size of the paving stones, as well as depending on factors such as the projected weight of the traffic on the paving stones, for example, pedestrian traffic or heavy truck traffic. In certain preferred embodiments, the height Y is 1⅝ inches extending substantially perpendicular from the lower end 21 to the upper end 23.

Extending out of the outer surface 26 of the upright restraining strip 20 at the lower end 21 is a base extension strip 28. The base extension strip 28 is also in the form of a continuous strip disposed in a plane perpendicular to the upright restraining strip 20. The base extension strip 28 has an upper surface 29 which faces ground level, and a lower surface 31 which faces down into the ground when installed. In the preferred embodiment, the base extension strip 28 has a length X which is greater than the height Y of the upright restraining strip 20. Although this length can be any dimension depending on the circumstances in which the edge restraint is being used as discussed above, a preferred range is about two to six inches. In the preferred embodiment where the height Y of the upright restraining strip 20 is 1⅝ inches, the length X of the base extension strip 28 is 3⅜ inches.

The ratio of the length X of the extension base strip 28 to the height Y of the upright strip 20 in certain preferred embodiments is between 1.5 and 3.5 with a preferred ratio of about 2.1. Optimum conversion of horizontal forces into vertical forces into the ground are achieved by having the base strip longer than the upright strip. The forces will be spread out over a larger area, and thus provide increased support. Also, the longer base strip provides greater flexibility such that the edging will flex and conform to contours of the base surface. Thus, the edging can be used on irregular or curved contours such as dips or inclines.

In certain preferred embodiments, the upright restraining strip 20 and the base extension strip 28 are in perpendicular planes, and therefore the angle A therebetween is 90°.

In the preferred embodiments, the edge restraint 18 includes a juncture region 30 where the base extension strip and the upright restraining strip meet. Extending on the inner surface 22 of the upright restraining strip 20 is a lip 32 lying in the same plane as the base extension strip 28. The lip 32 has an upper surface 34 over which the paving stone 24 lies. After installation, a layer of bedding sand 33 is usually disposed between the paving stone 24 and the lip 32. The lip 32 helps to prevent the edge restraint 18 from rising up above ground level.

Especially in areas where the ground freezes, known edge restraints are subject to a frost heave, in which continuous freezing and thawing causes the edge restraints to rise up. The paving stone 24 and bedding ]and] 33 under the paving stone resting on the lip 32 prevent a frost heave. Further, in this embodiment, the alternating freezing and thawing actually act to force the edging down toward the paving stones.

Extending between the upright restraining strip 20 and the base extension strip 28, is a force converting connecting strip 36 which connects the upright restraining strip 20 to the base extension strip 28. The connecting strip 36 extends from an outer end 38 of the base extension strip 28 toward the upright restraining strip 20. The connecting strip 30 should connect to the upright restraining strip somewhere above a midpoint 40 of the upright restraining strip 20. In certain preferred embodiments, the connecting strip 36 connects to the upright restraining strip midway between the midpoint 40 and the upper end 23. Also, in certain preferred embodiments, the angle B between the base extension strip 28 and the connecting strip 38 is in the range of 10° to 30°.

In addition to the connecting strip 36, a cross strip 42 is provided for added support. The cross strip 42 extends from the juncture 30 of the upright restraining strip 20 and the base extension strip 28 at an angle toward and connected to the connecting strip 36. The angle C between the juncture of the base extension strip 28 and the cross strip 42 in certain preferred embodiments is in the range of 30° to 50°. In the preferred embodiment the cross strip 42 joins the connecting strip 36 about 1⅛ inches from the outer face 26 of the upright restraining strip 36, and thus the cross strip has a length of approximately 1¼ to 1⅜ inches.

The upright restraining strip 20 has a thickness from the inner surface 22 to the outer surface 26 which is greater than the thickness of each of the base extension strip 28, the connecting strip 36 and the cross strip 42. In certain preferred embodiments, the thickness of the upright restraining strip is ⅛ inch, and the thickness of each of the base extension strip 28, connecting strip 36 and cross strip 42 is 1/16 inch. Using the preferred dimensions and angles discussed thus far, the preferred length M measured parallel to the plane of the base extension strip 28 from the juncture of the base extension strip 28 and the connecting strip 36 to the juncture of the cross strip 42 and the connecting strip 36 is approximately 2⅜ inches.

Stake apertures 44 are provided through the connecting strip 36, the cross strip 42 and the base extension strip 28. Each stake aperture 44 receives a stake 46 which is driven into the ground to add further support and helps to convert forces. The stake can be made of metal, aluminum, PVC or any other suitable material. In the preferred embodiments, the stake aperture 44 has a diameter of ⅜ inch. In the preferred embodiment having the dimensions and angles discussed thus far, the center of the stake aperture is located in the base extension strip 28, ⅝ inch from the inner surface 22 of the upright restraining strip 20.

The stake aperture 44 extends upright through an axis parallel to the upright restraining strip 20 from the base extension strip 28 through the cross strip 42 and the connecting strip 36 depending on the load requirements of the restraint edge as discussed above, the stake apertures 44 are placed at regular intervals along the continuous restraint edge strip. In certain preferred embodiments, the stake apertures are placed every two feet along the restraint edge.

Figure 2:
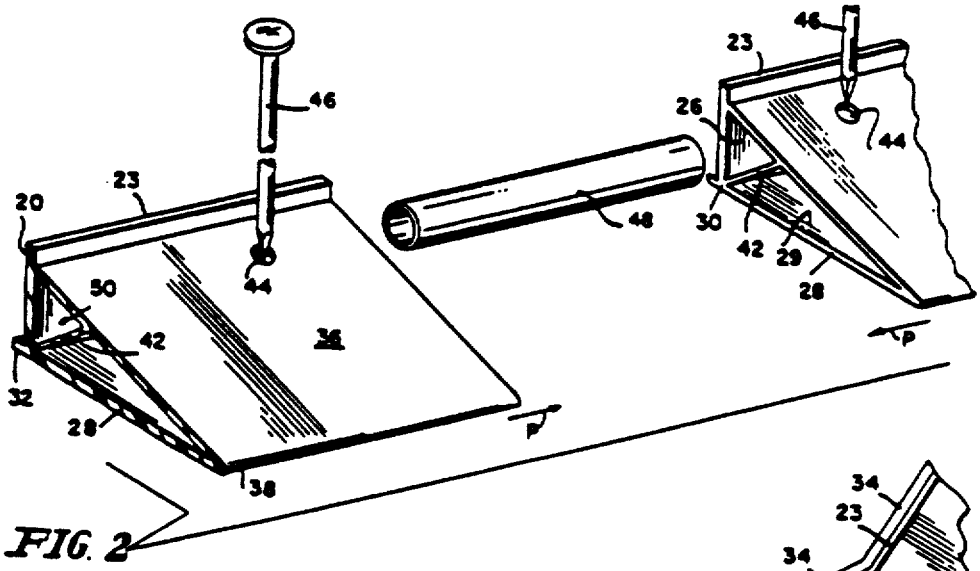
FIG. 2 is a perspective view of two attached sections of an embodiment of the invention and the element connecting the two sections.
Figure 3:
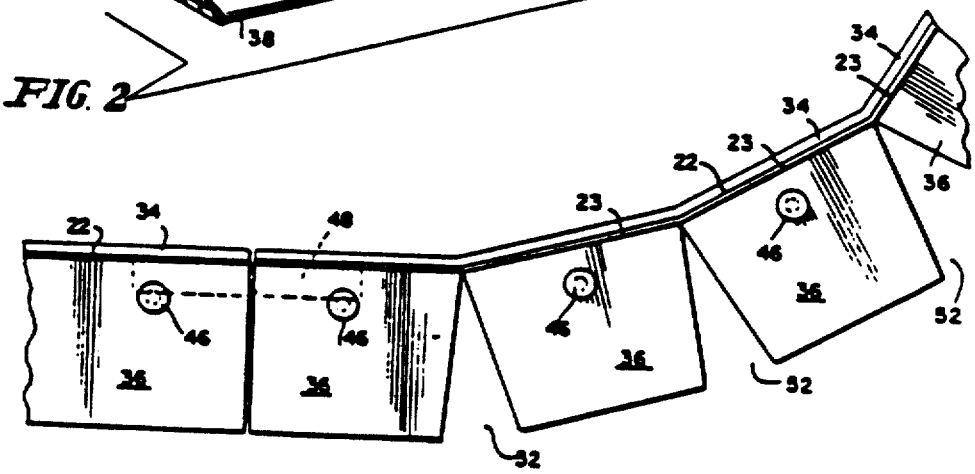
FIG. 3 is a top view according to another preferred embodiment of the invention used in a curved border.

As shown in FIGS. 2 and 3, the separate edge restraint sections can be connected using a cylinder 48 of PVC, aluminum or any other suitable material. The connecting cylinder 48 is pushed into an interior area 50 of each edge restraint formed in between the cross-sectional triangle formed by the borders of the upright restraining strip 20, the connecting strip 36 and the cross strip 42. The connecting cylinder 48 should have an outside diameter which fits snugly within the area 50.

To join adjacent edge restraint sections, the connecting cylinder 48 is placed in the respective triangular areas 50 of each section and the sections are pushed together as shown by arrows P in FIG. 2. Thus, extensions of any length can be suitable connected together. In certain preferred embodiments, the edge restraints are extruded in 15 foot length sections, which can subsequently be cut into smaller sections as desired quite easily.

Also, in certain preferred embodiments, the cylinder 48 can be dimensioned such that it extends partially into a stake aperture area, as shown by dashed lines in FIG. 3. When the stake is driven in, the stake wedges into the cylinder, thereby resulting in a strong attachment of the stake itself and the cylinder in the edge restraint.

Figure 4:
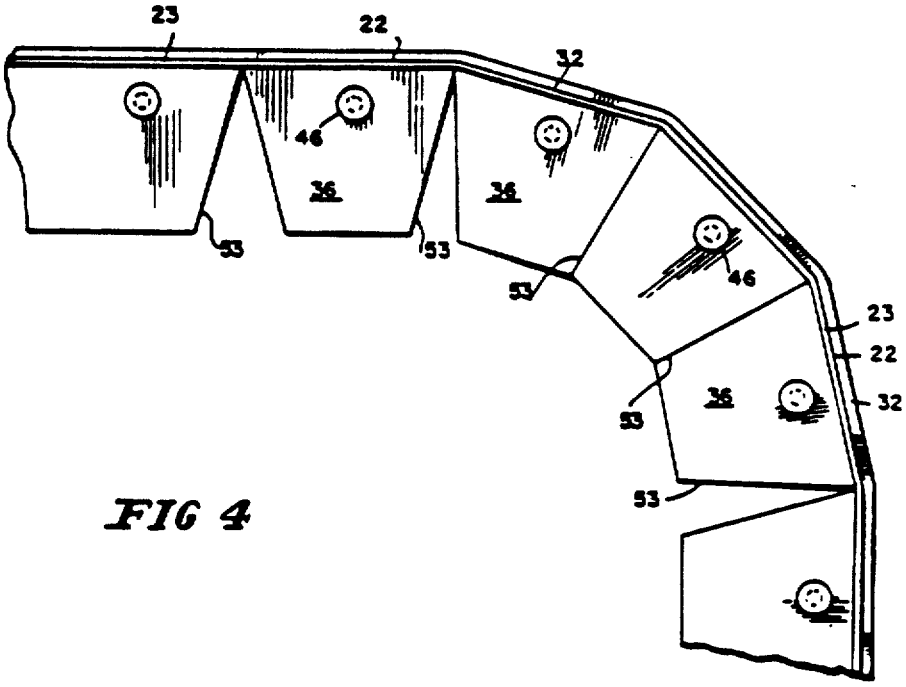
FIG. 4 is a top view according to another preferred embodiment of the invention used in a curved border.

As shown in FIGS. 3 and 4, portions of the connecting strip 36, cross strip 42 and base extension strip 28 can be cut out to facilitate bending of the edge restraint to define curved boundaries of paving stones. These areas can be cut with a hack saw or sharp knife Such cuts can be made at the site of installation, or the extrusions can be manufactured with cut out portions in the edge restraint.

Depending on the amount of curvature, the direction of curvature and the loading requirements, the cut out portions can range from a cut line, as shown in FIG. 3, to a triangular slice, as shown in FIG. 4, having an angle leading from an apex at the upright restraining strip 20 depending on the necessary degree of flexibility for increased curvature. Also, the distance these cut out portions are spaced from one another varies depending on the degree of curvature necessary.

As shown in FIG. 3, when a curve toward the paving stones is desired, all that is required is a single line cut which upon bending creates a triangular space 52 in between cut portions. As shown in FIG. 4, when a curve away from the paving stones is desired, triangular sections 53 are cut out. The size of the cut out triangular section 53 depends on the degree of curvature desired.

Figure 5:
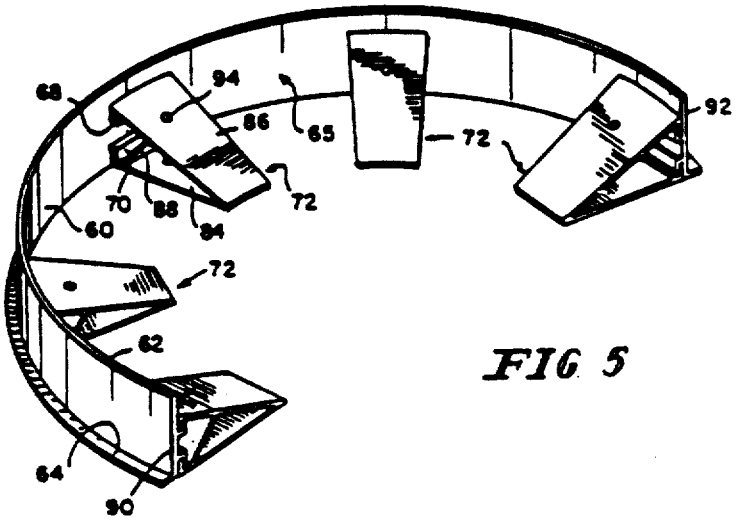
FIG. 5 is a perspective view according to another preferred embodiment of the invention used in a curved border.
Figure 6:
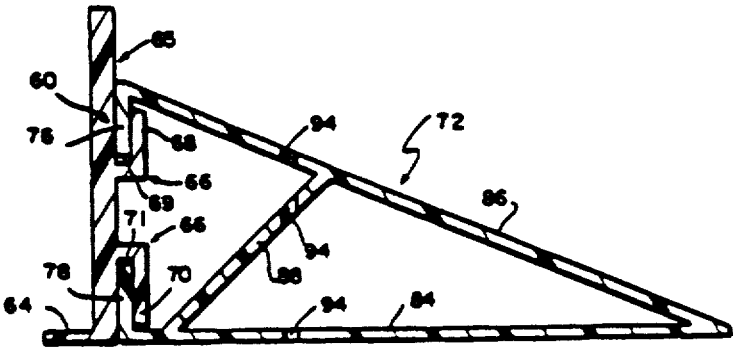
FIG. 6 is a cross-sectional side view of the embodiments according to FIG. 5.

FIG. 5 shows other preferred embodiments for use in providing a curved border. In these embodiments, no cutting is required. An upright restraining strip 60 includes a top edge 62 and a bottom area including a lip 64 which will face toward the paving stones, and over which the paving stones are disposed.

On the side 65 of the upright restraining strip 60 facing away from the stones, an attachment element 66 is provided. In the shown embodiment, the attachment element 66 includes an upward facing flange 68 and a downward facing flange 70. The attachment element 66 extends from the upright restraining element 60 in a T-shape and forms slots 69 and 71 between the flanges 68 and 70 and the upright restraining strip. The attachment element can run continuously along the entire backside 65 or can be placed in periodic sections along the backside 65. According to certain preferred embodiments, these sections are placed from ten inches to fourteen inches apart, although any value of spacing can be used.

Separate back profile sections or attachment sections 72 engage in the attachment element 66. In the shown embodiment, the back profile section 72 includes complementary, mating attachment elements 76, 78 which can be slid onto the upright restraining strip attachment elements 66. The mating attachment elements include projecting attachment flanges 76 and 78 which slide into spaces 69 and 71, respectively, disposed between the flanges 68 and 70 and the upright restraining strip 60. The back profile sections include a horizontal base extension strip 84 which faces the ground, and serves the same purpose and can have the same dimensions as the base extension strip 28 used in the unitary embodiment discussed above.

Similarly, the back profile elements 72 include a connecting strip element 86 extending from the upright restraining strip 60 to the horizontal extension strip 84. The connecting strip element 86 can have like dimensions and serves the same purpose as the connecting strip element 18 of the unitary embodiment discussed above.

Further, the back profile element 72 includes a cross-strip element 88 extending from the attachment element flanges 70, 78 and the horizontal extension strip 84 to the connecting strip element 86. The cross-strip element 88 serves the same purpose and can include the same dimensions as the cross-element 42 of the unitary embodiment discussed above.

In the embodiments according to FIG. 5, the upright restraining strip 60 can be flexed to match the desired radius. The back profile elements 72 are then placed periodically along the connecting element 66 of the upright restraining strip 60. Alternatively, the back profile elements 72 can be placed on the attachment element 66 prior to the flexing of the upright restraining strip 60.

According to certain preferred embodiments, the back profile elements 72 should be placed about twelve inches apart and should be included on the ends 90,92 of the sections of the upright restraining strip to facilitate attachment to the remainder of the edge restraint system. The connecting strip elements 86 and base extension strip elements 84 include stake apertures 94 through which stakes are inserted. Depending on the placement of the cross-strips 88, the cross-strips will also include a stake aperture which coincides with the apertures of the connecting strip elements and the base strip elements. This system provides strong support, a high degree of flexibility and ease of use.

The materials which can be used in forming the restraint edge extrusion include plastic material which can be extruded such as polyvinyl chloride (PVC). These materials should be flexible enough to promote bending to provide for irregular boundaries of paving stones. Further, in the event that the upper end of the upright restraining strip 20 sticks out above the ground level, a large weight applied thereto should result in bending and subsequent flexure back into the original shape. This material should also be easier to cut than metal materials. Aluminum can also be used, although is not always preferred due to lower flexibility and increased difficulty involved in cutting.

In use, the earth 19 which will surround the installed paving stones 24 to be restrained within a boundary is excavated deeper than the height Y of the upright restraining strip 20 such that the installed edge restraint will be located below ground level. The continuous ditch should have a width slightly larger than the length X of the base extension strip 28 plus the length of the lip 32. Gravel or another suitable base layer is then placed in the bottom of the ditch. The edge restraint is then placed in the ditch with the extension strip lower surface 31 facing into the gravel. The edge restraint is flexed to the proper contour shape of the boundary desired with the upright restraining strip inner surface 22 facing the area to be paved.

Stakes 46 are then driven through the stake apertures 44 in the restraint edge 18 at the given intervals. After the stakes have been driven in, a layer of bedding sand 33 is placed over the area in which the paving stones will be placed. As shown in FIG. 1, this layer of bedding sand is included over the lip 32 of the edge restraint. In certain preferred embodiments, this layer of bedding sand is one-half inch to one inch deep. The top 23 of the upright restraining strip 20 can be used as a guide for the screeding of the sand. The guide would have a properly spaced notch to engage on the top 23 such that the proper depth of sand is achieved.

After the bedding sand is placed, the paving stones are installed over the top of the bedding sand. The paving stones are placed up against the upright restraining strip inner surface 22 on the paving stone border perimeter. The paving stones can be of any size, and in certain preferred embodiments the depth of the paving stone from the bedding sand to the top surface of the paving stone is $1\frac{1}{2}$ to $2\frac{3}{4}$ inches. The paving stones can then be compacted (tamped) prior to backfilling. The edge restraint system is completely self-supporting, and will hold heavy loads even applied to the edge itself. Thus, the tamping machine can be run directly over the edge area.

The paving stone installer can then leave the site, as the paving stones are completely supported by the edge restraint system even before backfilling. Thus, a landscaper can be afforded more flexibility and can backfill and sod as desired without the possibility or accidentally ruining the supporting edge restraint system. The installer can also backfill the area above and adjacent the edge restraint with soil, dirt, gravel, sod, or the like, such that the upper end 23 of the upright restraining strip 20 is beneath ground level 17.

Further, optimum conditions for grass growth above the edge restraint are provided with the present invention. In hot climates, soil underneath grass can become extremely hot if little space is provided between an underground structure such as concrete, metal or plastic. In prior concrete systems, a lack of sufficient space between the concrete and grass has resulted in grass dying over the edging. The present system can be disposed completely underground and well below the top surface such that grass can survive right up to the edge of the paving stones.

In certain preferred embodiments, the material is filled in over the edge restraint such that the ground level formed is flush with the top surface of the paving stone. Therefore, with paving stones having a greater depth, more filling material will be necessary.

The unique restraint edge provides an invisible strong barrier to maintain a boundary of paving stones for many years. With the unique material used, corrosion will be minimal. A strong restraint maintaining the paving stones in horizontal direction results as horizontal forces shown by arrow H coming from the paving stones 24 to the upright restraining strip 20 are converted through the connecting strip 36 and cross strip 42 into vertical forces into the ground as shown by arrow V into the earth E. The earth's resistance against vertical movement of the base extension strip 28 provides a much stronger reinforcement than horizontal shifting forces applied to dirt as well as any forces directed toward the upper surface ground level.

Further, the integrity of the edge restraint will be maintained even if the earth erodes and sections thereof become exposed above ground level as the material used helps prevent chipping, cracking or permanent deformation from forces above. The stakes also provide added support in converting horizontal forces to vertical forces. The stakes also give added support to the conversion elements including the connecting strip 36 and the cross strip 42.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

[1. Paving stone edge restraint apparatus for edging and restraining paving stones on a base surface comprising:

substantially vertical strip restraining means for defining a boundary around said paving stones, said substantially vertical strip restraining means being flexibly formed to accommodate for irregular shaped boundaries around said paving stones, said substantially vertical strip restraining means including a first side surface for facing said paving stones and for receiving substantially horizontal forces from said paving stones and a second side surface facing away from said paving stones;

substantially horizontal extension means extending out laterally from said second side surface of said substantially vertical strip restraining means;

force converting means interconnecting said substantially vertical strip restraining means to said substantially horizontal extension means in the form of a closed hollow profile for converting said horizontal forces received by said substantially vertical strip restraining means into vertical forces into said base surface; and attaching means for providing a detachable mounting of at least one of said horizontal extension means and said force converting means to said vertical strip restraining means.]

[2. Apparatus as in claim 1, wherein at least one of said horizontal extension means and said force converting means include a plurality of sections detachably disposed in spaced intervals on said vertical strip restraining means.]

[3. Apparatus as in claim 2, wherein said force converting means include connecting strip means extending from said vertical strip restraining means and being inclined toward said horizontal extension means when attached to said vertical strip restraining means.]

[4. Apparatus as in claim 3, wherein said horizontal extension means extends from a lower end region of said vertical strip restraining means when attached to said vertical strip restraining means and said connecting strip means extends from a region greater than half the length of said vertical strip restraining means above said horizontal extension means when attached to said vertical strip restraining means.]

[5. Apparatus as in claim 2, wherein said vertical strip restraining means and said horizontal extension means are connected to one another at a 90° angle.]

[6. Apparatus as in claim 5, wherein said force converting means include connecting means extending from said vertical strip restraining means and being inclined toward said horizontal extension means when attached to said vertical strip restraining means.]

[7. Apparatus as in claim 2, further including stake means inserted through said force converting means and said horizontal extension means.]

[8. Apparatus as in claim 7, wherein said inserted stake means is substantially parallel to said vertical strip restraining means.]

[9. Apparatus as in claim 2, wherein said force converting means and said horizontal extension means each include an aperture therethrough for receiving a stake, said aperture of said force converting means and said horizontal extension means being aligned around a common axis substantially parallel to said vertical strip restraining means.]

[10. Apparatus as in claim 2, further including connecting peg means for connecting adjacent sections of vertical strip restraining means, said connecting peg means wedging into at least a portion of said closed hollow profile.]

[11. Apparatus as in claim 2, wherein at least a portion of said force converting means, at least a portion of said vertical strip restraining means and at least a portion of said horizontal extension means form said closed hollow profile.]

[12. Apparatus as in claim 2, wherein said force converting means include connecting means connecting said vertical strip restraining means to said horizontal extension means when attached to said vertical strip restraining means.]

[13. Apparatus as in claim 12, wherein said connecting means include a connecting strip means connecting said vertical strip restraining means to said horizontal extension means, and cross connecting strip means connecting a central portion of said connecting strip means to at least one of said vertical strip restraining means and said horizontal extension means.]

[14. Apparatus as in claim 13, wherein said cross connecting strip means extends from said connecting strip central portion to a juncture of said vertical strip restraining means and said horizontal extension means.]

[15. Apparatus as in claim 2, wherein said horizontal extension means and said force converting means comprise separate attachment sections being removably attached to said vertical strip restraining means.]

[16. Apparatus as in claim 15, wherein said vertical strip restraining mean is a continuous strip and said attachment sections are removably disposed in spaced intervals on said vertical strip restraining means.]

[17. Apparatus as in claim 15, wherein said attaching means provides a sliding attachment between said vertical strip restraining mean and said attachment sections.]

[18. Apparatus as in claim 17, wherein said attaching means include projections extending out from said vertical strip restraining means and mating projections on said attachment sections which engage into said vertical strip restraining means projections.]

[19. Apparatus as in claim 18, wherein said vertical strip restraining means projections extend out from said vertical strip restraining means in a T-shape forming slots between said vertical strip restraining means projections and said vertical strip restraining means, and said mating projections being fitted into said slots.]

[20. Apparatus as in claim 16, wherein said spaced intervals are in the range of about 10 inches to 14 inches.]

[21. Paving stone restraint system comprising:

a plurality of paving stones;

substantially vertical strip restraining means for defining a boundary around said paving stones, said substantially vertical strip restraining means being flexibly formed to accommodate for irregular shaped boundaries around said paving stones, said substantially vertical strip restraining means including a first side surface for facing said paving stones and for receiving substantially horizontal forces from said paving stones and a second side surface facing away from said paving stones; and substantially horizontal extension means extending out laterally from said second side surface of said substantially vertical strip restraining means; and force converting means interconnecting said substantially vertical strip restraining means to said substantially horizontal extension means in the form of a closed hollow profile for converting said horizontal forces received by said substantially vertical strip restraining means into vertical forces into a base surface.]

[22. Arrangement as in claim 21, wherein said horizontal extension means includes base strip means extending out substantially transverse from vertical strip restraining means in a lower region.]

[23. Arrangement as in claim 22, wherein said force converting means include connecting strip means for connecting said vertical strip restraining means to said base strip means.]

[24. Arrangement as in claim 23, wherein said connecting strip means, a portion of said vertical strip restraining means and a portion of said base strip means form a triangular cross section, said connecting strip means forming a longest side of said triangular cross section.]

[25. Arrangement as in claim 24, wherein said connecting strip means, said vertical strip restraining means and said base strip means are a continuous extrusion.]

[26. Paving stone edge restraining apparatus for edging and restraining paving stones on a base surface comprising:

substantially vertical strip restraining means for defining a boundary around said paving stones, said substantially vertical strip restraining means being flexibly formed to accommodate for irregular shaped boundaries around said paving stones, said substantially vertical strip restraining means including a first side surface for facing said paving stones and for receiving substantially horizontal forces from said paving stones and a second side surface facing away from said paving stones; and substantially horizontal extension means extending out laterally from said second side surface of said substantially vertical strip restraining means; and force converting means interconnecting said substantially vertical strip restraining means to said substantially horizontal extension means in the form of a closed hollow profile for converting said horizontal forces received by said substantially vertical strip restraining means into vertical forces into said base surface.]

[27. Apparatus as in claim 26, wherein said extension means have a total length extending from said vertical strip restraining means together than a first length portion of said vertical strip restraining means extending from said extension means to an upper end of said vertical strip restraining means.]

[28. Apparatus as in claim 26, wherein said extension means include base extension strip means extending out substantially transverse from said surface of said vertical strip restraining means in a lower region.]

[29. Apparatus as in claim 28, wherein said base extension means include a continuous planar base extension strip.]

[30. Apparatus as in claim 28, wherein said force converting means include connecting means for connecting said vertical strip restraining means to said base extension means.]

[31. Apparatus as in claim 30, wherein said connecting means include a continuous planar connecting strip.]

[32. Apparatus as in claim 30, wherein said connecting means further include a connecting strip connecting said vertical strip restraining means and horizontal extension means and cross connecting means connecting a central portion of said connecting strip to at least one of said vertical strip restraining means and said base extension means.]

[33. Apparatus as in claim 30, wherein said connecting means, a portion of said vertical strip restraining means and a portion of said base extension means form a triangular cross section, said connecting means forming a longest side of said triangular cross section.]

[34. Apparatus as in claim 33, wherein said triangular cross section includes a right triangle and said connecting means is a hypotenuse of said right triangle.]

[35. Apparatus as in claim 33, wherein said connecting means include a continuous planar connecting strip, said base extension means include a continuous planar base extension strip and said vertical strip restraining means include a continuous planar vertical restraining strip, said base strip and vertical strip having a continuous juncture line parallel to said defined boundary of said paving stones.]

[36. Apparatus as in claim 35, wherein said base extension strip has a length extending from said vertical restraining strip longer than a length of said vertical restraining strip extending from said base extension strip to an upper end of said vertical restraining strip.]

[37. Apparatus as in claim 36, wherein said base extension strip has a length of about three to four inches and said vertical restraining strip has a length of about one to two inches.]

[38. Apparatus as in claim 36, wherein said connecting strip extends from an outer end of said base extension strip at an end opposite to said vertical restraining strip to said vertical restraining strip at a line approximately three-fourths of said vertical restraining strip length from said base extension strip.]

[39. Apparatus as in claim 38, wherein said vertical restraining strip includes a border length parallel to said boundary of said paving stones, said connecting strip including cut out portions along intervals of said vertical restraining planar strip border length, said base extension strip including cut out portions corresponding to said cut out portions of said connecting strip.]

[40. Apparatus as in claim 39, wherein said cut out portions of said connecting strip and said base extension strip are triangular sections, said triangular sections having an apex at a juncture of said connecting strip and said vertical restraining strip and at a juncture of said base extension strip and said vertical restraining strip.]

[41. Apparatus as in claim 35, wherein said connecting strip and said base extension strip include an aperture therethrough for receiving a stake, said aperture of the connecting strip and the base extension strip being aligned around a common axis parallel to the vertical restraining strip.]

[42. Apparatus as in claim 35, further including connecting peg means for connecting adjacent sections of vertical restraining strips, said connecting peg means wedging in between said triangular cross section.]

[43. Apparatus as in claim 35, further including a lower lip extending from the inner surface of said vertical restraining strip in the same plane as the base extension strip.]

[44. Apparatus as in claim 26, wherein said force converting means includes connecting means, extending from said vertical strip restraining means and being inclined toward said horizontal extension means.]

[45. Apparatus as in claim 44, wherein said horizontal extension means extends from a lower end region of said vertical strip restraining means and said connecting means extends from a region greater than half the length of said vertical strip restraining means above said horizontal extension means.]

[46. Apparatus as in claim 26, wherein said vertical strip restraining means and said horizontal extension means are connected to one another at a 90° angle.]

[47. Apparatus as in claim 46, wherein said force converting means includes connecting means extending from said vertical strip restraining means and being inclined toward said horizontal extension means.]

[48. Apparatus as in claim 26, further including stake means inserted through said force converting means and said horizontal extension means.]

[49. Apparatus as in claim 48, wherein said inserted stake means is substantially parallel to said vertical strip restraining means.]

[50. Apparatus as in claim 26, wherein said vertical strip restraining means includes a border length parallel to said boundary of said paving stones, said force converting means including cut out portion along intervals of said vertical strip restraining means, said horizontal extension means including cut out portions corresponding to said cut out portions of said force converting means.]

[51. Apparatus as in claim 26, wherein said force converting means and said horizontal extension means each include an aperture therethrough for receiving a stake, said aperture of said force converting and said horizontal extension means being aligned around a common axis parallel to said vertical strip restraining means.]

[52. Apparatus as in claim 26, further including connecting peg means for connecting adjacent sections of vertical strip restraining means, said connecting peg means wedging into at least a portion of said closed hollow profile.]

[53. Apparatus as in claim 26, wherein said force converting means, at least a portion of said vertical strip restraining means and at least a portion of said horizontal extension means form said closed hollow profile.]

[54. Apparatus as in claim 26, wherein said vertical strip restraining means, said horizontal extension means and said force converting means are a continuous extrusion.]

[55. Apparatus as in claim 32, wherein said cross connecting means extends from said connecting strip central portion to a juncture of said vertical strip restraining means and said base extension means.]

[56. Apparatus as in claim 54, further including connecting peg means for connecting adjacent sections of vertical strip restraining means, said connecting peg means wedging in between said vertical strip restraining means, said connecting strip and said cross connecting means.]

[57. Apparatus as in claim 41, further including a plurality of said stake apertures and a stake extending through each of said stake apertures.]

[58. Support apparatus for edging and restraining a hard surface means in a given position on ground surface comprising:

substantially vertical strip restraining means for defining a boundary around said hard surface means, said vertical strip restraining means having an upper region, a lower region, an inner surface facing toward said hard surface means for receiving substantially horizontal forces from said hard surface means, and an outer surface facing away from said hard surface means;

base strip extension means extending out from said outer surface of said vertical strip restraining means in said lower region for receiving vertical forces relative to the ground surface;

force converting means for converting said horizontal forces received by said vertical strip restraining means into vertical forces against said base strip extension means thereby restraining said hard surface means in said boundary, said force converting means including connecting strip means for connecting said vertical strip restraining means to said base strip extension means; and wherein said connecting strip means, a portion of said vertical strip restraining means and a portion of said base extension means form a triangular cross section, said vertical strip restraining means including a border length parallel to said boundary of said hard surface means, said connecting strip means including cut out portions along intervals of said vertical strip restraining means border length, and base strip extension means including cut out portion corresponding to said cut out portions of said connecting strip means.]

[59. Apparatus as in claim 58, wherein said triangular cross section is a closed hollow profile.]

[60. Landscaping support apparatus for edging and restraining a hard surface means in a given position on ground surface comprising:

substantially vertical strip restraining means for defining a boundary around said hard surface means, said vertical strip restraining means having an upper region, a lower region, an inner surface facing toward said hard surface means for receiving substantially horizontal forces from said hard surface means, and an outer surface facing away from said hard surface means;

base strip extension means extending out from said outer surface of said vertical strip restraining means in said lower region for receiving vertical forces relative to the ground surface;

force converting means for converting said horizontal forces received by said vertical strip restraining means into vertical forces against said base strip extension means thereby restraining said hard surface means in said boundary, said force converting means including connecting strip means for connecting said vertical strip restraining means to said base strip extension means;

wherein said connecting means, a portion of said vertical strip restraining means and a portion of said base extension means form a triangular cross section; and connecting peg means for connecting adjacent sections of said vertical strip restraining means, said connecting peg means wedging in between said triangular cross section formed between said vertical strip restraining means, said connecting strip means and said base strip extension means.]

[61. Apparatus as in claim 60, wherein said triangular cross section is a closed hollow profile.]

[62. Support apparatus for restraining a hard surface means in a given position comprising:

substantially vertical strip restraining means for defining a boundary around said hard surface means, said vertical strip restraining means having an upper region, a lower region, an inner surface facing toward said hard surface means for receiving substantially horizontal forces from said hard surface means, and an outer surface facing away from said hard surface means;

base strip extension means extending out from said outer surface of said vertical strip restraining means in said lower region for receiving vertical forces relative to the ground surface; and force converting means for converting said horizontal forces received by said vertical strip restraining means into vertical forces against said base strip extension means thereby restraining said hard surface means in said boundary, said force converting means including connecting strip means for connecting said vertical strip restraining means to said base strip extension means;

wherein said connecting means, a portion of said vertical strip restraining means and a portion of said base extension means form a triangular cross section, said connecting means forming a longest side of said triangular cross section;

wherein said vertical strip restraining means and said base strip extension means are integrally connected to one another at said lower region of the vertical strip restraining means, and wherein the horizontal length of the base strip extension means is between 1.5 and 3.5 times the vertical height of the vertical strip restraining means.]

[63. Apparatus as in claim 62, wherein said triangular cross section is a closed hollow profile.]

[64. Apparatus according to claim 62, wherein said connecting means, a portion of said vertical strip restraining means and a portion of said base extension means form a triangular cross section, said connecting strip means and said base strip extension means each including an aperture therethrough for receiving a stake, said apertures of said connecting strip means and said base strip extension means being aligned around a common axis parallel to said vertical strip restraining means.]

[65. Apparatus according to claim 64, wherein triangular cross section is a closed hollow profile.]

*66. Support apparatus for edging and restraining a hard surface means in a given position on ground surface comprising:*

*substantially vertical strip restraining means for defining a boundary around said hard surface means, said vertical strip restraining means having an upper region, a lower region, an inner surface facing toward said hard surface means for receiving substantially horizontal forces from said hard surface means, and an outer surface facing away from said hard surface means;*

*base strip extension means extending out from said outer surface of said vertical strip restraining means in said lower region for receiving vertical forces relative to the ground surface;*

*force converting means for converting said horizontal forces received by said vertical strip restraining means into vertical forces against said base strip extension means thereby restraining said hard surface means in said boundary, said force converting means including connecting strip means for connecting said vertical strip restraining means to said base strip extension means; and*

*wherein said connecting strip means, a portion of said vertical strip restraining means and a portion of said base extension means form a triangular cross section, said vertical strip restraining means including a border length parallel to said boundary of said hard surface means, said connecting strip means including cut out portions along intervals of said vertical strip restraining means border length, said base strip extension means including cut out portions corresponding to said cut out portions of said connecting strip means.*

*67. Apparatus as in claim 66, wherein said triangular cross section is a closed hollow profile.*

*68. Landscaping support apparatus for edging and restraining a hard surface means in a given position on ground surface comprising:*

*substantially vertical strip restraining means for defining a boundary around said hard surface means, said vertical strip restraining means having an upper region, a lower region, an inner surface facing toward said hard surface means for receiving substantially horizontal forces from said hard surface means, and an outer surface facing away from said hard surface means;*

*base strip extension means extending out from said outer surface of said vertical strip restraining means in said lower region for receiving vertical forces relative to the ground surface;*

*force converting means for converting said horizontal forces received by said vertical strip restraining means into vertical forces against said base strip extension means thereby restraining said hard surface means in said boundary, said force converting means including connecting strip means for connecting said vertical strip restraining means to said base strip extension means;*

*wherein said connecting means, a portion of said vertical strip restraining means and a portion of said base extension means form a triangular cross section; and*

*connecting peg means for connecting adjacent sections of said vertical strip restraining means, said connecting peg means wedging in between said triangular cross section formed between said vertical strip restraining means, said connecting strip means and said base strip extension means.*

*69. Apparatus as in claim 68, wherein said triangular cross section is a closed hollow profile.*

*70. Paving stone edge restraint apparatus for edging and restraining paving stones on a base surface comprising:*

*substantially vertical strip restraining means for defining a boundary around said paving stones, said substantially vertical strip restraining means being flexibly formed to accommodate for irregular shaped boundaries around said paving stones, said substantially vertical strip restraining means including a first side surface for facing said paving stones and for receiving substantially horizontal forces from said paving stones and a second side surface facing away from said paving stones;*

*substantially horizontal extension means extending out laterally from said second side surface of said substantially vertical strip restraining means;*

*force converting means interconnecting said substantially vertical strip restraining means to said substantially horizontal extension means in the form of a closed hollow profile for converting said horizontal forces received by said substantially vertical strip restraining means into vertical forces into said base surface;*

*attaching means for providing a detachable mounting of at least one of said horizontal extension means and said force converting means to said vertical strip restraining means;*

*wherein at least one of said horizontal extension means and said force converting means include a plurality of sections detachably disposed in spaced intervals on said vertical strip restraining means; and*

*wherein said horizontal extension means and said force converting means comprise separate attachment sections being removably attached to said vertical strip restraining means.*

*71. Apparatus as in claim 70, wherein said vertical strip restraining means is a continuous strip and said attach-*

*ment sections are removably disposed in spaced intervals on said vertical strip restraining means.*

*72. Apparatus as in claim 70, wherein said attaching means provides a sliding attachment between said vertical strip restraining mean and said attachment sections.*

*73. Apparatus as in claim 72, wherein said attaching means include projections extending out from said vertical strip restraining means and mating projections on said attachment sections which engage into said vertical strip restraining means projections.*

*74. Apparatus as in claim 73, wherein said vertical strip restraining means projections extend out from said vertical strip restraining means in a T-shape forming slots between said vertical strip restraining means projections and said vertical strip restraining means, and said mating projections being fitted into said slots.*

*75. Apparatus as in claim 71, wherein said spaced intervals are in the range of about 10 inches to 14 inches.*

*76. Apparatus as in claim 70, wherein said force converting means include connecting strip means extending from said vertical strip restraining means and being inclined toward said horizontal extension means when attached to said vertical strip restraining means.*

*77. Apparatus as in claim 76, wherein said horizontal extension means extends from a lower end region of said vertical strip restraining means when attached to said vertical strip restraining means and said connecting strip means extends from a region greater than half the length of said vertical strip restraining means above said horizontal extension means when attached to said vertical strip restraining means.*

*78. Apparatus as in claim 70, wherein said vertical strip restraining means and said horizontal extension means are connecting to one another at approximately a 90° angle.*

*79. Apparatus as in claim 78, wherein said force converting means include connecting means extending from said vertical strip restraining means and being inclined toward said horizontal extension means when attached to said vertical strip restraining means.*

*80. Apparatus as in claim 70, further including anchoring means engaged into the base surface.*

*81. Apparatus as in claim 80, wherein said anchoring means extends from an intermediate portion of said force converting means downwardly into the base surface.*

*82. Apparatus as in claim 80, wherein said anchoring means includes a stake means arranged substantially parallel to said vertical strip restraining means.*

*83. Apparatus as in claim 70, wherein said force converting means and said horizontal extension means each include an aperture therethrough for receiving a stake, said aperture of said force converting means and said horizontal extension means being aligned around a common axis substantially parallel to said vertical strip restraining means.*

*84. Apparatus as in claim 70, further including connecting peg means for connecting adjacent sections of vertical strip restraining means, said connecting peg means wedging into at least a portion of said closed hollow profile.*

*85. Apparatus as in claim 70, wherein at least a portion of said converting means, at least a portion of said vertical strip restraining means and at least a portion of said horizontal extension means form said closed hollow profile.*

*86. Apparatus as in claim 70, wherein said force converting means include connecting means connecting said vertical strip restraining means to said horizontal extension means when attached to said vertical strip restraining means.*

*87. Paving stone edge restraint apparatus according to claim 70, wherein said vertical strip restraining means has sufficient flexibility to flex back into shape after experiencing said horizontal forces caused by traffic travelling over the hard surface means.*

*88. Paving stone edge restraint apparatus according to claim 78, wherein said hard surface means accommodate heavy vehicle traffic.*

*89. Paving stone edge restraining apparatus for edging and restraining paving stones on a base surface comprising:*

*substantially vertical strip restraining means for defining a boundary around said paving stones, said substantially vertical strip restraining means being flexibly formed to accommodate for irregular shaped boundaries around said paving stones, said substantially vertical strip restraining means including a first side surface for facing said paving stones and for receiving substantially horizontal forces from said paving stones and a second side surface facing away from said paving stones;*

*substantially horizontal extension means extending out laterally from said second side surface of said substantially vertical strip restraining means;*

*force converting means interconnecting said substantially vertical strip restraining means to said substantially horizontal extension means in the form of a closed hollow profile for converting said horizontal forces received by said substantially vertical strip restraining means into vertical forces into said base surface;*

*wherein said extension means include base extension strip means extending out substantially transverse from said surface of said vertical strip restraining means in a lower region;*

*wherein said force converting means include connecting means for connecting said vertical strip restraining means to said base extension means;*

*wherein said connecting means, a portion of said vertical strip restraining means and a portion of said base extension means form a triangular cross section, said connecting means forming a longest side of said triangular cross section;*

*wherein said connecting means include a continuous planar connecting strip, said base extension means include a continuous planar base extension strip and said vertical strip restraining means include a continuous planar vertical restraining strip, said base strip and vertical strip having a continuous juncture line parallel to said defined boundary of said paving stones;*

*wherein said base extension strip has a length extending from said vertical restraining strip longer than a length of said vertical restraining strip extending from said base extension strip to an upper end of said vertical restraining strip;*

*wherein said connecting strip extends from an outer end of said base extension strip at an end opposite to said vertical restraining strip to said vertical restraining strip at a line approximately three-fourths of said vertical restraining strip length from said base extension strip; and*

*wherein said vertical restraining strip includes a border length parallel to said boundary of said paving stones, said connecting strip including cut out portions along intervals of said vertical restraining planar strip border length, said base extension strip including cut out portions corresponding to said cut out portions of said connecting strip.*

*90. Apparatus as in claim 89, wherein said cut out portions of said connecting strip and said base extension strip are triangular sections, said triangular sections having an apex at a juncture of said connecting strip and said vertical restraining strip and at a juncture of said base extension strip and said vertical restraining strip.*

*91. Paving stone edge restraining apparatus for edging and restraining paving stones on a base surface comprising:*

*substantially vertical strip restraining means for defining a boundary around said paving stones, said substantially vertical strip restraining means being flexibly formed to accommodate for irregular shaped boundaries around said paving stones, said substantially vertical strip restraining means including a first side surface for facing said paving stones and for receiving substantially horizontal forces from said paving stones and a second side surface facing away from said paving stones;*

*substantially horizontal extension means extending out laterally from said second side surface of said substantially vertical strip restraining means; and*

*force converting means interconnecting said substantially vertical strip restraining means to said substantially horizontal extension means in the form of a closed hollow profile for converting said horizontal forces received by said substantially vertical strip restraining means into vertical forces into said base surface; and*

*wherein said vertical strip restraining means includes a border length parallel to said boundary of said paving stones, said force converting means including cut out portions along intervals of said vertical strip restraining means, said horizontal extension means including cut out portions corresponding to said cut out portions of said force converting means.*

*92. Apparatus as in claim 91, wherein said extension means have a total length extending from said vertical strip restraining means longer than a first length portion of said vertical strip restraining means extending from said extension means to an upper end of said vertical strip restraining means.*

*93. Apparatus as in claim 91, wherein said extension means include base extension strip means extending out substantially transverse from said surface of said vertical strip restraining means in a lower region.*

*94. Apparatus as in claim 93, wherein said base extension means include a continuous planar base extension strip.*

*95. Apparatus as in claim 93, wherein said force converting means include connecting means for connecting said vertical strip restraining means to said base extension means.*

*96. Apparatus as in claim 95, wherein said connecting means include a continuous planar connecting strip.*

*97. Apparatus as in claim 95, wherein said connecting means further include a connecting strip connecting said vertical strip restraining means and horizontal extension means and cross connecting means connecting a central portion of said connecting strip to at least one of said vertical strip restraining means and said base extension means.*

*98. Apparatus as in claim 95, wherein said connecting means, a portion of said vertical strip restraining means and a portion of said base extension means form a triangular cross section, said connecting means forming a longest side of said triangular cross section.*

*99. Apparatus as in claim 98, wherein said triangular cross section includes a right triangle and said connecting means is a hypotenuse of said right triangle.*

*100. Apparatus as in claim 95, wherein said connecting means include a continuous planar connecting strip, said base extension means include a continuous planar base extension strip and said vertical strip restraining means include a continuous planar vertical restraining strip, said base strip and vertical strip having a continuous juncture line parallel to said defined boundary of said paving stones.*

*101. Apparatus as in claim 100, wherein said base extension strip has a length extending from said vertical restraining strip longer than a length of said vertical restraining strip extending from said base extension strip to an upper end of said vertical restraining strip.*

*102. Apparatus as in claim 101, wherein said base extension strip has a length of about three to four inches and said vertical restraining strip has a length of about one to two inches.*

*103. Apparatus as in claim 95, wherein said connecting strip and said base extension strip include an aperture therethrough for receiving a stake, said aperture of the connecting strip and the base extension strip being aligned around a common axis parallel to the vertical restraining strip.*

*104. Apparatus as in claim 95, further including connecting peg means for connecting adjacent sections of vertical restraining strips, said connecting peg means wedging in between said closed hollow profile.*

*105. Apparatus as in claim 95, further including a lower lip extending from the inner surface of said vertical restraining strip in the same plane as the base extension strip.*

*106. Apparatus as in claim 91, wherein said vertical strip restraining means and said horizontal extension means are connected to one another at approximately a 90° angle.*

*107. Apparatus as in claim 91, further including anchoring means engaged into the base surface.*

*108. Apparatus as in claim 107, wherein said anchoring means extends from an intermediate portion of said force converting means downwardly into the base surface.*

*109. Apparatus as in claim 108, wherein said anchoring means includes a stake means inserted through said force converting means and said horizontal extension means into the base surface.*

*110. Apparatus as in claim 91, wherein said force converting means and said horizontal extension means each include an aperture therethrough for receiving a stake, said aperture of said force converting means and said horizontal extension means being aligned around a common axis parallel to said vertical strip restraining means.*

*111. Apparatus as in claim 91, wherein said vertical strip restraining means, said horizontal extension means and said force converting means are a continuous extrusion.*

*112. Paving stone edge restraint apparatus according to claim 91, wherein said vertical strip restraining means has sufficient flexibility to flex back into shape after experiencing said horizontal forces caused by traffic travelling over the hard surface means.*

*113. Paving stone edge restraint apparatus according to claim 112, wherein said hard surface means accommodating heavy vehicle traffic.*

*114. Paving stone edge restraining apparatus for edging and restraining paving stones on a base surface comprising:*

*substantially vertical strip restraining means for defining a boundary around said paving stones, said substantially vertical strip restraining means being flexibly formed to accommodate for irregular shaped boundaries around said paving stones, said substantially vertical strip restraining means including a first side surface for facing said paving stones and for receiving substantially horizontal forces from said paving stones*

*and a second side surface facing away from said paving stones;*

*substantially horizontal extension means extending out laterally from said second side surface of said substantially vertical strip restraining means; and*

*force converting means interconnecting said substantially vertical strip restraining means to said substantially horizontal extension means in the form of a closed hollow profile for converting said horizontal forces received by said substantially vertical strip restraining means into vertical forces into said base surface;*

*wherein said vertical strip restraining means, said horizontal extension means and said force converting means are a continuous extrusion; and*

*further including connecting peg means for connecting adjacent sections of vertical strip restraining means, said connecting peg means wedging into at least a portion of said closed hollow profile in between said vertical strip restraining means, said connecting strip and said cross connecting means.*

*115. Support apparatus for restraining a hard surface means in a given position comprising:*

*substantially vertical strip restraining means for defining a boundary around said hard surface means, said vertical strip restraining means having an upper region, a lower region, an inner surface facing toward said hard surface means for receiving substantially horizontal forces from said hard surface means, and an outer surface facing away from said hard surface means;*

*base strip extension means extending out from said outer surface of said vertical strip restraining means in said lower region for receiving vertical forces relative to the ground surface; and*

*force converting means for converting said horizontal forces received by said vertical strip restraining means into vertical forces against said base strip extension means thereby restraining said hard surface means in said boundary, said force converting means including connecting strip means for connecting said vertical strip restraining means to said base strip extension means, said force converting means further including reinforcing means for said connecting strip means;*

*wherein said connecting means, a portion of said vertical strip restraining means and a portion of said base extension means form a triangular cross section, said connecting means forming a longest side of said triangular cross section;*

*wherein said vertical strip restraining means and said base strip extension means are connected to one another at said lower region of the vertical strip restraining means; and*

*wherein said connecting means, a portion of said vertical strip restraining means and a portion of said base extension means form a triangular cross section, said connecting strip means and said base strip extension means each including an aperture therethrough for receiving a stake, said apertures of said connecting strip means and said base strip extension means being aligned around a common axis parallel to said vertical strip restraining means.*

*116. Apparatus according to claim 115, wherein said force converting means is at least partially disposed below the ground surface.*

*117. Apparatus according to claim 115, wherein said hard surface means is locatable on a prepared base surface disposed below the ground surface.*

*118. Apparatus according to claim 117, wherein said hard surface means are paving stones.*

*119. Apparatus according to claim 115, wherein said vertical strip restraining means has sufficient flexibility to flex back into shape after experiencing said horizontal forces caused by traffic travelling over the hard surface means.*

*120. Paving stone edge restraint apparatus according to claim 119, wherein said hard surface means accommodate heavy vehicle traffic.*

*121. Apparatus according to claim 116, further comprising attaching means for providing a detachable mounting of at least one of said base strip extension means and said force converting means to said vertical strip restraining means.*

*122. Apparatus according to claim 121, wherein at least one of said horizontal extension means and said force converting means include a plurality of sections detachably disposed in spaced intervals on said vertical strip restraining means.*

*123. Apparatus as in claim 122, wherein said horizontal extension means and said force converting means comprise separate attachment sections being removably attached to said vertical strip restraining means.*

*124. Apparatus as in claim 123, wherein said vertical strip restraining means is a continuous strip and said attachment sections are removably disposed in spaced intervals on said vertical strip restraining means.*

*125. Apparatus as in claim 122, wherein said attaching means provides a sliding attachment between said vertical strip restraining mean and said attachment sections.*

*126. Apparatus as in claim 125, wherein said attaching means include projections extending out from said vertical strip restraining means and mating projections on said attachment sections which engage into said vertical strip restraining means projections.*

*127. Apparatus as in claim 126, wherein said vertical strip restraining means projections extend out from said vertical strip restraining means in a T-shape forming slots between said vertical strip restraining means, and said mating projections being fitted into said slots.*

*128. Apparatus according to claim 116, wherein said vertical strip restraining means and said base strip extension means are integrally connected to one another at said lower region of the vertical strip restraining means.*

*129. Apparatus according to claim 128, wherein the horizontal length of the base strip extension means is between 1.5 and 3.5 times the vertical height of the vertical strip restraining means.*

*130. Apparatus according to claim 116, wherein said vertical strip restraining means, base strip extension means and said connecting means are formed as one piece of plastic material.*

*131. Apparatus according to claim 130, wherein the one piece of plastic material is an extrusion molded plastic piece.*

*132. Apparatus according to claim 116, wherein said triangular cross section has a closed hollow profile and further including connecting peg means for connecting adjacent sections of said vertical strip restraining means, said connecting peg means frictionally engaging with at least a portion of the interior of said closed hollow profile.*

*133. Apparatus according to claim 116, wherein said reinforcing means includes a cross connecting strip connecting a central portion of said connecting strip means to at least one of said vertical strip restraining means and said base strip extension means.*

*134. Apparatus according to claim 133, wherein said cross connecting strip central portion to a juncture of said vertical restraining means and said base strip extension means.*

*135. Apparatus according to claim 115, wherein said base strip extension means extends out substantially transverse from said outer surface of said vertical restraining means.*

*136. Apparatus according to claim 135, wherein said base strip extension means include a continuous planar base extension strip.*

*137. Apparatus according to claim 136, wherein said connecting strip means include a continuous planar connecting strip.*

*138. Apparatus according to claim 137, wherein said vertical strip restraining means include a continuous planar vertical restraining strip, said base strip and vertical strip having a continuous juncture line parallel to said defined boundary of said hard surface means.*

*139. Apparatus according to claim 115, wherein said base extension strip has a length of approximately three to four inches and said vertical restraining strip has a length of approximately one to two inches.*

*140. Apparatus according to claim 115, wherein said connecting strip extends from an outer end of said base extension strip at an end opposite to said vertical restraining strip to said vertical restraining strip at a line approximately three-fourths of said vertical restraining strip length from said base extension strip.*

*141. Apparatus according to claim 115, further including a lower lip extending from the inner surface of said vertical strip restraining means in the same plane as the base strip extension means.*

*142. Apparatus as in claim 115, wherein said vertical strip restraining means includes a border length parallel to said boundary of said hard surface means, said force converting means including cut out portion along intervals of said vertical strip restraining means, said base strip extension means including cut out portions corresponding to said cut out positions of said force converting means.*

*143. Apparatus as in claim 142, wherein said cut out portions of said connecting strip and said base extension strip are triangular sections, said triangular sections having an apex at a juncture of said connecting strip and said vertical restraining strip and at a juncture of said base extension strip and said vertical restraining strip.*

*144. A paving installation, comprising: (i) paving surface means for accommodating traffic which is use experiences substantial horizontal forces at its lateral edges and which is located on top of a substantially level base surface, and (ii) edge restraint means for receiving said horizontal forces and maintaining the paving surface means in position, said edge restraint means being at least partially disposed below local ground level and including:*

*(a) an upright member engaged with lateral edges of the paving surface means and having sufficient flexibility to accommodate irregular shaped boundaries along said lateral edges with said upright member exhibiting a first surface abuttingly engaging the lateral edges of the paving surface means, a second surface opposed to the first surface, and a top surface;*

*(b) an extension member disposed laterally of the upright member and including a bottom surface portion located on the base surface; and*

*(c) force converting means operatively arranged between the upright member and the extension member for transferring the substantial horizontal forces imparted to the first surface of the upright member via the paving surface means to the base surface, said edge restraint means including anchoring means engaged into the base surface.*

*145. A paving installation according to claim 144, wherein said force converting means includes reinforcement means extending downwardly from said upright member toward the base surface.*

*146. A paving installation according to claim 145, wherein said anchoring means extends from an intermediate portion of the reinforcement means downwardly into the base surface.*

*147. A paving installation according to claim 146, wherein said anchoring means includes an anchoring spike passing through said extension member.*

*148. A paving installation according to claim 146, wherein said anchoring means further includes an aperture formed therein said reinforcing means having a longitudinal axis substantially parallel to said upright member.*

*149. A paving installation according to claim 148, wherein said aperture further extends through said extension member for receiving a stake therethrough.*

*150. A paving installation according to claim 145, wherein said upright member and said reinforcement means are formed as one piece of plastic material.*

*151. A paving installation according to claim 150, wherein the one piece plastic piece is an extrusion molded plastic piece.*

*152. A paving installation according to claim 150, wherein said anchoring means extends from an intermediate portion of the reinforcement means downwardly into the base surface.*

*153. A paving installation according to claim 152, wherein said anchoring means includes an anchoring spike which protrudes through the reinforcement means.*

*154. A paving installation according to claim 153, wherein said anchoring means further includes an aperture formed through said reinforcing means having a longitudinal axis substantially parallel to said upright member.*

*155. A paving installation according to claim 145, wherein said force converting means transfer the substantial horizontal forces to the base surface via said extension member.*

*156. A paving installation according to claim 145, wherein said reinforcing means includes a cross strip means connecting an intermediate portion of said reinforcing means with at least one of said upright member and extension member.*

*157. A paving installation according to claim 145, wherein said extension member is integrally connection to a lower region of said upright member.*

*158. A paving installation according to claim 157, wherein said reinforcement means connects said upright member to said extension member.*

*159. A paving installation according to claim 158, wherein said upright member, said extension member and said reinforcing means form a substantially triangular cross-section, said reinforcing means forming the longest side of said triangular cross section.*

*160. A paving installation according to claim 159, wherein said upright member, said extension member and said reinforcing means are a continuous extrusion.*

*161. A paving installation according to claim 149, wherein said triangular cross section has a closed hollow profile and further including connecting peg means for connecting adjacent sections of said edge restraint means, said connecting peg means wedging in said closed hollow profile.*

*162. A paving installation according to claim 161, wherein said anchoring means includes an aperture formed through said reinforcing means and extension member having a longitudinal axis substantially parallel to said upright member for receiving an anchoring stake, the anchoring stake frictionally engaging with said connecting peg means near the edges of adjacent sections of said edge restraint.*

*163. A paving installation according to claim 157, wherein said extension member has a total length extending from the upright member longer than a first length portion of the upright member extending from said extension member to said top surface of said upright member.*

*164. A paving installation according to claim 157, wherein said extension member has a length of approximately three to four inches and said upright member has a length of approximately one to two inches.*

*165. A paving installation according to claim 157, wherein said reinforcing means extends from an outer end of said extension member at one end opposite said upright member to said upright member at a point approximately three-fourths of said upright member length from said extension member.*

*166. A paving installation according to claim 157, wherein including a lower lip extending from the first surface of said upright member in the same plane as said extension member.*

*167. A paving installation according to claim 144, wherein said top surface is located at or below the local ground level.*

*168. A paving installation according to claim 144, wherein said upright member has sufficient flexibility to flex back into shape after experiencing horizontal forces caused by traffic travelling over the paving surface means.*

*169. Paving stone edge restraint apparatus according to claim 168, wherein said hard surface means accommodate heavy vehicle traffic.*

*170. A paving installation according to claim 144, wherein said extension member is a planar extension member and wherein said upright member is a planar upright member.*

*171. A paving installation according to claim 170, wherein said force converting means includes reinforcement means connecting said planar upright member and said planar extension member, said reinforcement means including a planar reinforcing member.*

*172. A paving installation according to claim 171, wherein said planar upright member and planar extension member have a continuous juncture line parallel to the lateral edges of said paving surface means.*

*173. A paving installation according to claim 144, wherein said paving surface means are paving stones.*

*174. A paving installation according to claim 173, wherein said paving surface means accommodates heavy vehicle traffic.*

*175. A paving installation according to claim 144, wherein comprising:*

*attaching means for providing a detachable mounting of at least one of said extension member and said force converting means to said upright member.*

*176. Apparatus as in claim 191, wherein said upright member and said extension member are connected to one another at approximately a 90° angle.*

*177. Apparatus as in claim 175, wherein said extension member and said force converting means comprise separate attachment sections being removably attached to said upright member.*

*178. Apparatus as in claim 197, wherein said attaching means provides a sliding attachment between said upright member and said attachment sections.*

*179. Apparatus as in claim 178, wherein said attaching means include projections extending out from said upright member and mating projections on said attachment sections which engage into said upright member projections.*

*180. Apparatus as in claim 179, wherein said upright member projections extend out from said upright member in a T-shape forming slots between said upright member, and said mating projections being fitted into said slots.*

*181. Apparatus as in claim 177, wherein said upright member is a continuous strip and said attachment sections are removably disposed in spaced intervals on said upright member.*

*182. Apparatus as in claim 181, wherein said spaced intervals are in the range of about 10 inches to 14 inches.*

*183. Apparatus as in claim 144, wherein said upright member includes a border length parallel to said boundary of said paving surface means, said force converting means including cut out portion along intervals of said upright member, said extension member including cut out portions corresponding to said cut out portions of said force converting means.*

*184. Apparatus as in claim 183, wherein said cut out portions of said force converting means and said extension member are triangular sections, said triangular sections having an apex at a juncture of said force converting means and said upright member and at a juncture of said extension member and said upright member.*

* * * * *